Figure 1:
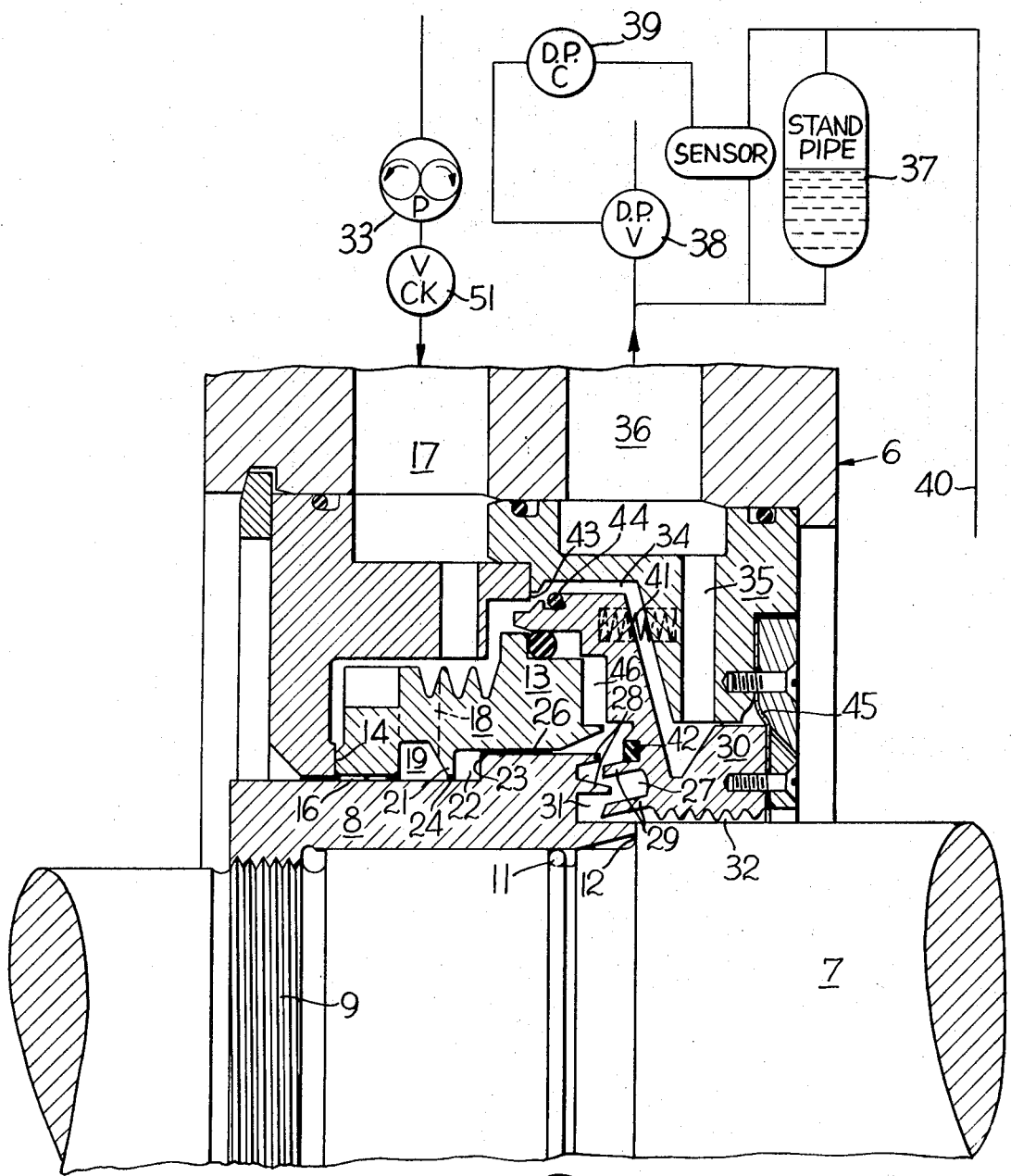

United States Patent
Lesiecki

[15] 3,679,217
[45] July 25, 1972

[54] AUTOMATIC SHUTDOWN SEAL

[72] Inventor: Gerald Lesiecki, Greendale, Wis.

[73] Assignee: Allis-Chalmers Manufacturing Company, Milwaukee, Wis.

[22] Filed: Oct. 27, 1970

[21] Appl. No.: 84,297

[52] U.S. Cl. ................................... 277/3, 277/15, 277/22, 277/28
[51] Int. Cl. .......................................... F16j 15/40
[58] Field of Search .................. 277/3, 9, 13, 15, 22, 17, 25, 277/27, 28, 32, 67, 68, 70, 135

[56] References Cited

UNITED STATES PATENTS

| | | |
|---|---|---|
| 3,062,554 | 11/1962 | McGahan et al ..................... 277/27 X |
| 3,122,374 | 2/1964 | McGahan ............................. 277/27 |
| 1,789,329 | 1/1931 | Wolf ..................................... 277/67 X |
| 3,410,565 | 11/1968 | Williams ............................. 277/27 X |

Primary Examiner—Edward J. Earls
Attorney—John P. Hines, Robert B. Benson and Charles L. Schwab

[57] ABSTRACT

A rotary shaft seal is provided with a sealing fluid to seal a process fluid. A spring-biased mechanical shaft seal automatically closes and seals the process fluid from the atmosphere when the sealing fluid pressure is lost. During machine operation the pressure generated by the sealing fluid overcomes the force of the springs to open the mechanical seal.

1 Claim, 2 Drawing Figures

Inventor
Gerald Lesiecki
By John B Hines
Attorney

3,679,217

AUTOMATIC SHUTDOWN SEAL

CROSS REFERENCE TO RELATED PATENT APPLICATION

This invention pertains to a rotary shaft seal which is similar to the subject matter disclosed in my copending U.S. Pat. application, Ser. No. 84,296, filed Oct. 27, 1970, entitled "New Trapped Bushing Seal" which was filed concurrently with this application.

As the use of rotating machinery has expanded and the temperatures and pressures of the process fluids have increased, the ever present problem of providing a seal between a rotating shaft and a stationary housing has become more complex. A particularly difficult situation arises when it is required to seal a caustic or explosive gas. Since in this type of situation it is necessary to insure a complete sealing of the gas, liquid seals are quite frequently used. For ease of explanation, this description will refer to the process fluid as a gas and the sealing fluid as a liquid. However, it should be understood that the invention disclosed may be used in other applications so long as the sealing fluid has a greater density than the process fluid.

There are three basic types of seals which will be referred to in this description. A mechanical seal as herein used refers to a seal wherein there is actual physical contact between the rotating and stationary portions of the seal. A liquid film seal as used herein refers to a seal wherein a pair of bushings or a dual bushing is buffered with a sealing liquid at a positive pressure above the process gas. A pumping type liquid film seal as used herein refers to a seal wherein a liquid film type seal mentioned above is backed up with a pumping device which inhibits the flow of sealing liquid towards the process gas during operation.

Each of these three different types of seals has inherent drawbacks. The obvious drawback of the mechanical seal is due to the physical contact between the rotating and stationary portions of the seal which results in wearing of these portions and ultimate failure; the possibility of catastrophic failure always exists. However, it does have the inherent quality of being a positive seal during static conditions without a sealing fluid.

The liquid film seal, although not subject to the wearing drawbacks of the mechanical seal, is only effective while the sealing fluid is provided. The liquid film seal has a high loss of sealing fluid toward the process gas unless the clearances between the shaft and bushing are kept very small, less than one mil clearance per inch of shaft diameter, and/or the sealing fluid pressure over the process gas is low. Therefore, the liquid film seal is vulnerable to sudden temperature change which often results in failure and/or entrainment of the process gas into the sealing liquid in the clearance area which results in small quantities of the gas escaping to atmosphere. This entrainment and its causes will be explained more fully later in the description.

In the pumping type liquid film seal, the sealing liquid is always maintained at a substantial pressure above the process gas pressure to prevent entrainment of process gas in the sealing liquid so complete sealing of the process gas can be assured with a low loss of sealing fluid towards the process gas at operating speed comparable to that of the mechanical seal. Such a seal is disclosed in U.S. Pat. No. 3,127,181, issued Mar. 31, 1964, and assigned to the same assignee as this invention. While that seal has proven quite satisfactory, there is a possibility of loss of sealing liquid pressure which would permit the process gas to escape to atmosphere.

It is therefore the intention and general object of this invention to provide a pressure pumping type liquid film seal wherein a mechanical seal automatically isolates the process fluid when the machine is shutdown or the sealing liquid pressure is lost.

Figure 2:
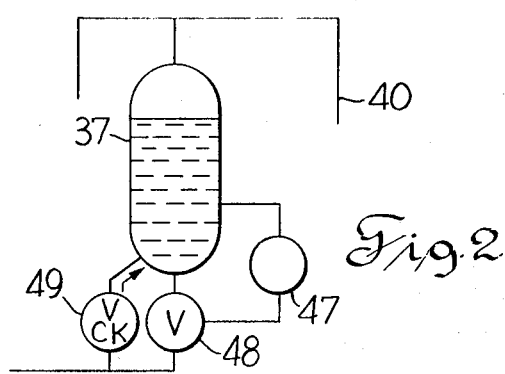

This and other objects of the subject invention will become more fully apparent as the following description is read in light of the attached drawing herein:

FIG. 1 shows a cross sectional view of a seal constructed in accordance with the invention; and FIG. 2 shows a modified form of standpipe shutoff control.

Referring to the drawing a machine casing generally designated 6 has an opening therethrough in which is received a rotatable shaft 7. In this description, the left-hand end of the machine casing would be exposed to atmosphere and the right-hand end of the machine casing would be connected to the rest of the rotating machine containing pressurized gas to be sealed. A sleeve element or impeller 8 is rigidly connected to the shaft 7 in any conventional manner for rotation therewith. As herein shown for purposes of illustration, the shaft is provided with a threaded portion 9 onto which the impeller 8 is threaded. A conventional O-ring 11 may be provided between the shaft and impeller 8 to insure a seal therebetween. A locating shoulder 12 may be provided on the shaft to insure proper axial location of the impeller 8.

A stepped dual bushing 13 is positioned about the impeller 8 in radial clearance therewith of the magnitude commonly used in journal bearings. This stepped bushing may be constructed as a separate element as shown herein so that it will float with the shaft 7 and impeller 8. One end portion of the stepped bushing 13 is in intimate contact with an end wall 14 of the outer seal housing to provide secondary sealing of the sealing liquid from the atmosphere. The impeller 8 and stepped bushing 13 define annular restricted fluid passages 16 and 26 which are open to the atmosphere and pressurized gas, respectively.

A sealing liquid inlet passage 17 is provided in the machine casing 6. The inlet passage 17 is in liquid communication with a passageway 18 through the stepped bushing 13. The passageway 18 communicates with an annular inlet chamber 19 located about the impeller 8 and defined by walls of the stepped bushing 13. The inlet chamber 19 is in liquid communication with one end of the restricted fluid passage 16.

An annular ridge 21 on an interior surface of the stepped bushing 13 forms one wall of the inlet chamber 19 and also one wall of a pumping chamber 22. This pumping chamber 22 is defined by the ridge 21 and the stepped bushing 13 and a shoulder 23 on the impeller 8. The interior annular edge of the ridge 21 defines an annular restricted port 24 connecting the inlet chamber 19 with the pumping chamber 22. Since this port 24 has a much smaller axial surface than the restricted fluid passage 16 or 26, it offers less resistance to liquid flow than the restricted fluid passage.

Annular restricted fluid passage 26 also serves as a transfer fluid passage. This transfer passage is at a greater radius than the port 24 and the restricted fluid passage 16 due to the shoulder 23 provided on the impeller 8. The transfer fluid passage is in fluid communication with the pumping chamber 22 and with a radial passage generally designated 27. The transfer passage restricts the leakage of sealing liquid toward the process gas during static conditions or part speed operation. The radial passage 27 is defined by one end of the impeller 8 and a nonrotational portion of the seal housing or stator 30.

The radial passage 27 is composed of one or more radially spaced substantially axially disposed fingers 28 on the impeller 8. Complementary radially spaced annular substantially axially disposed fingers 29 are provided on the nonrotational stator 30. These interleaved fingers 28 and 29 define a pair of radially spaced annular swirl chambers 31. It should be understood that although two annular swirl chambers 31 are herein shown, one such chamber may be sufficient or certain applications may require more than two chambers.

The radially outer end of the radial passage 27 is in fluid communication with the annular transfer passage 26. The radially inner end of the radial passage 27 is in fluid communication with what is shown herein as a labyrinth-type passageway 32. This labyrinth-type passageway is defined by the shaft 7 and the stator 30. The opposite end of the labyrinth-type passageway 32 is in fluid communication with the process gas side of the seal.

A pump 33 is provided to supply the pressurized sealing liquid through a check valve 51 to the inlet passage 17. Cooling passages generally designated 34 and 35 connect the inlet passage 17 with a discharge passage 36. This discharge passage 36 is in communication with a stand pipe 37 and also with the system sump (not shown) through the differential pressure control valve 38. The stand pipe is also connected in fluid communication with the process fluid by conduit 40. Means may be provided in the form of a differential pressure control (or level control) 39 to insure sufficient liquid level in the stand pipe.

The operation of my seal thus far described is thoroughly discussed and described in my copending application previously identified herein. Briefly the sealing liquid enters the chamber 19 and flows into the pumping chamber 22. Due to centrifugal force the pressure of the sealing liquid is increased and it flows along the transfer passage 26 into the radial passage 27 where a liquid-gas interface is established effectively blocking the gas at this point while the machine is operating. This liquid sealing arrangement is satisfactory for most requirements. However, in certain instances a positive mechanical shutdown seal may be necessary in case of frequent and/or extensive shutdowns of the machine or if there is a loss of the sealing liquid supply. To this end the annular nonrotational piston stator 30 is mounted in the seal housing to permit axially sliding movement thereof. A plurality of circumferentially spaced spring biasing means 41 are positioned between the piston stator 30 and the seal housing 6 in any conventional manner such as by flat-bottomed holes provided in the adjoining faces of these two elements. These springs urge the piston 30 toward the impeller 8. An annular diaphragm 45 of a flexible material such as Teflon is provided between the seal housing 6 and piston stator 30 to efficiently seal the process gas. A soft ring 42 is provided in the face of the piston stator 30 and contacts one of the fingers 28 upon shutdown of the machine. This contact effectively seals the gas from the atmosphere and prevents any sealing liquid from flowing toward the gas.

An optional secondary seal may be provided between the seal housing 6 and the piston stator 30 in the cooling passage 34. To this end a shoulder 43 is provided on the seal housing in the cooling passage. An O-ring 44 is provided in a groove in the piston stator 30. This O-ring is carried by the piston stator under the force of the springs 41 into engagement with the shoulder 43 to effectively seal the cooling passage 34 when the pressure in chamber 46 drops below a predetermined amount and the sealing liquid source is lost.

As shown in FIG. 1, the seal thus far described is operating in the normal manner with the machine operating at normal speed. The pressure of the sealing liquid in chamber 46 is greater than the pressure in cooling passage 34 because of the pumping action in chamber 22. This higher pressure in chamber 46 overcomes the force of springs 41 forcing the piston stator to the right as shown in the drawing.

If the machine slows down below a predetermined speed, the pressure in chamber 46 drops because the pumping action in chamber 22 is a direct function of rotational speed. However, since pump 33 is of the positive displacement type, it will generate sufficient pressure to keep the seal 44 away from the shoulder 43 and the seal ring 42 away from the finger 28. If the machine is shut down for an extended period of time, pump 33 will be shut off and the mechanical seal will close effectively sealing the gas from atmosphere.

If the pump 33 should fail while the machine is still operating, the pressure in chamber 46 will keep passageway 34 open as long as the machine is operating above the aforementioned predetermined speed and there is sealing liquid in standpipe 37 to make up for any leakage in the system. In normal operation, a warning device would indicate the inoperative condition of the pump and shut the machine off. This would allow the seals 42 and 44 to close, sealing the gas and standpipe liquid respectively.

In some cases it may be desirable to permit the seal 42 to close when the machine shuts down but while the pump 33 is still running. This could be accomplished by removing the O-ring seal 44 and enlarging that area of passageway 34 so it would remain open when seal 42 is closed. This would permit the sealing liquid to circulate through passageway 34 while the mechanical seal 42 effectively isolates the gas and there would be no sealing liquid loss.

However, without seal 44, if the pump 33 stopped, the liquid in standpipe 37 would drain out exposing the process gas to atmosphere through conduit 40, standpipe 37 and passageways 34,35,18 and 16. This result can be overcome by providing the level switch device shown in FIG. 2. A level switch 47 is connected to the standpipe 37. The switch 47 is also connected to a valve 48 in the standpipe discharge line. When the level of sealing liquid in the standpipe drops to a predetermined level the switch 47 closes the valve 48. A check valve 49 is also provided to permit entrance of sealing liquid into the standpipe. When the pump 33 is again operating, sealing liquid will enter the standpipe 37 through the check valve 49. The liquid will enter the standpipe until the liquid head offers the desired differential pressure (or level) as sensed by the differential control and maintained by modulation of the differential pressure valve 38. The system then operates in the normal manner.

The embodiments of the invention in which an exclusive property or privilege is claimed are defined as follows:

1. In combination with a housing surrounding a rotatable shaft, means for sealing a high pressure fluid area from a low pressure fluid area comprising: a sealing fluid inlet passage in said housing; a sealing fluid outlet passage in said housing; a sealing fluid source in communication with said inlet passage supplying pressurized fluid thereto; walls defining a cooling passage connecting said inlet and outlet passages; a pumping chamber in said housing defined by a rotational wall and an adjacent stationary wall, said pumping chamber being in fluid communication with said inlet passage at a point downstream from the connection of said cooling passage to said inlet passage; a radial fluid passage defined by a rotational wall and a stationary wall in fluid communication with said high pressure area; a transfer passage defined by a rotating surface and a stationary surface connecting said pumping chamber in fluid communication with said radial passage, said radial passage exerting a backward pressure on said sealing fluid in opposition to the pressure created in said pumping chamber; annular rotational means associated with said shaft; annular nonrotational means surrounding said shaft and supported for axially slidable movement relative to the other means said axially slidable nonrotational means defining one wall of said cooling passage; a sealing fluid pressure chamber exposed to said axially slidable nonrotational means, said pressure chamber being in fluid communication with said sealing fluid downstream from said pressure chamber; a first pair of sealing elements on said rotational and nonrotational means; a second pair of sealing elements associated with said axially slidable nonrotational means in said cooling passage; and mechanical biasing means in contact with said axially slidable means urging said sets of sealing elements toward contact with one another, said biasing means exerting a force sufficient to cause said sealing elements to close and block the flow of high pressure fluid through said radial passage and close said cooling passage after the pressure of said sealing fluid has dropped below a predetermined level.

* * * * *